United States Patent [19]

Suganuma

[11] 4,124,304
[45] Nov. 7, 1978

[54] DIRECT DRUM DRIVE FOR CONCRETE MIXER TRUCKS

[75] Inventor: Koichi Suganuma, Yokohama, Japan

[73] Assignee: Okubo Haguruma Kogyo Kabushiki Kaisha, Kanagawa, Japan

[21] Appl. No.: 820,945

[22] Filed: Aug. 1, 1977

[30] Foreign Application Priority Data

Apr. 27, 1977 [JP] Japan .............................. 52-52671[U]

[51] Int. Cl.² ................................................ B28C 5/18
[52] U.S. Cl. ...................................... 366/60; 366/63; 233/23 R
[58] Field of Search .................................... 366/60–63, 366/219, 232, 233; 233/7, 23 R, 24, 25; 74/410, 411, 801; 62/9 R

[56] References Cited

U.S. PATENT DOCUMENTS 2,563,336  8/1951  Jaeger ..................................... 366/45
3,658,303  4/1972  Funk ....................................... 366/61
3,788,610  1/1974  Buelow et al. ......................... 366/60

Primary Examiner—Harvey C. Hornsby
Assistant Examiner—Timothy F. Simone
Attorney, Agent, or Firm—Wenderoth, Lind & Ponack

[57] ABSTRACT

A device for driving and supporting the drum of a concrete mixer truck comprises a casing fixedly mounted on the truck chassis by stud bolts, and a driving shaft connected in driving relationship with the drum by a universal coupling consisting of a driving member concentrically connected to the driving shaft and rotatably supported through a self-aligning roller bearing by the casing, and a driven member fixed to the drum and in driving engagement with the driving member with a spherical bearing disposed therebetween. All the driven member, self-aligning roller bearing and spherical bushing are concentrically arranged to rotate about a common center of rotation, and the connecting means is arranged on a reference plane in which the center of rotation lies.

6 Claims, 5 Drawing Figures

4,124,304

DIRECT DRUM DRIVE FOR CONCRETE MIXER TRUCKS

BACKGROUND OF THE INVENTION

This invention relates generally to a concrete mixer truck and particularly to a device for driving and supporting a drum of the truck. A principal object of this invention is to provide an improved construction for such a device which allows components thereof to be subjected to a minimum bending moment.

Another object of this invention is to provide a device which is inexpensive to manufacture.

SUMMARY OF THE INVENTION

In carrying out this invention in a preferred embodiment, there is provided a device for driving and supporting the drum of a concrete mixer truck. The device comprises a casing fixedly mounted on a truck chassis by connecting means, and a driving shaft connected in driving relationship with the drum by a universal coupling consisting of a driving member concentrically connected to the driving shaft and rotatably supported through a self-aligning roller bearing by the casing, and a driven member fixed to the drum and in driving engagement with the driving member with a spherical bearing disposed therebetween. All the driven member, self-aligning roller bearing and spherical bearing are arranged to rotate about a common center of rotation, and the connecting means is arranged on a reference plane in which the center of rotation lies.

The above and other objects, features and advantages of this invention will be more readily understood when the following detailed description is taken in conjunction with the drawings.

DESCRIPTION OF THE PREFERRED EMBODIMENT

Figure 1:
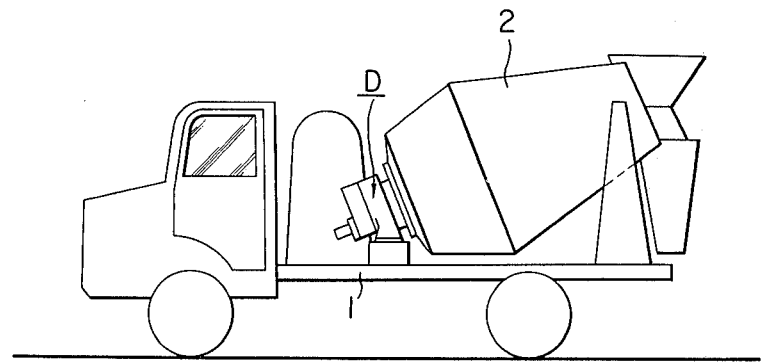
FIG. 1 is a view diagrammatically showing a concrete mixer truck.

Referring to FIG. 1, there is generally shown a concrete mixer truck in which a rotary drum 2 is adapted to be driven by a device generally denoted by the reference charactor D and supported on a chassis 1 as shown.

Figure 2:
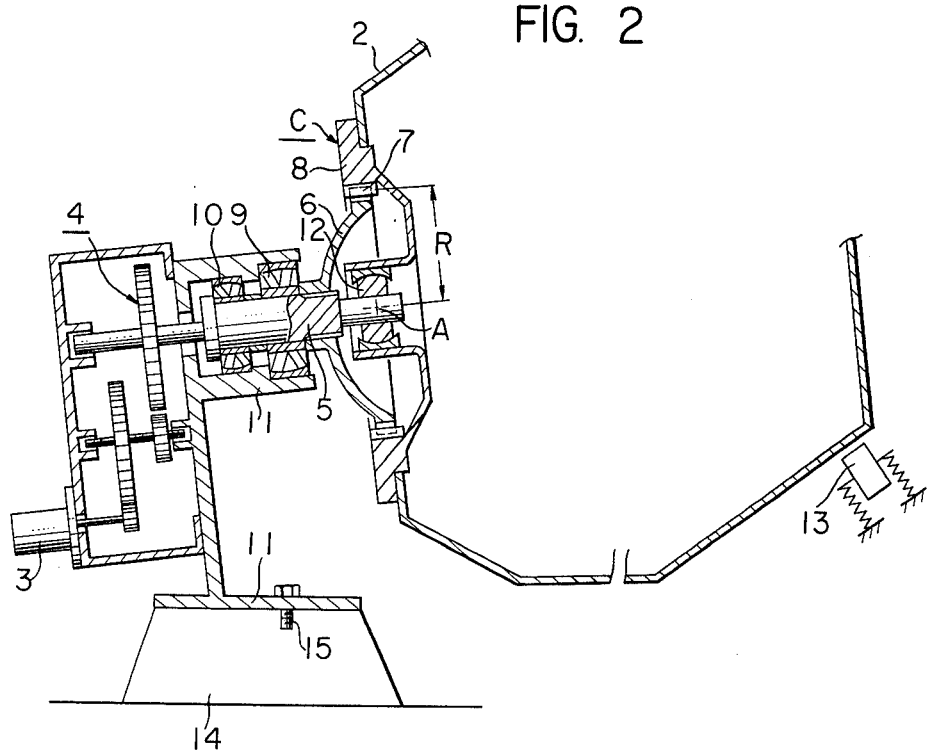
FIG. 2 is a sectional view of a prior art device for driving and supporting a drum of the concrete mixer truck.

In FIG. 2, a conventional design of such a device D is shown, wherein a driving force produced by a fluid operated motor 3 is transmitted through a suitable train of gears 4 to an output driving shaft 5 and hence through a spherical universal coupling C to the drum 2. The universal coupling C consists of a driving member 6 disposed in spline connection with the driving shaft 5, and a driven member 8 fixedly attached to one end of the drum 2 and disposed in driving engagement with the driving member 6. The device D further comprises a casing 11 supporting the driving shaft 5 for rotation through axially spaced bearings 9 and 10. The driving and driven members 6 and 8 of the spherical universal coupling C mesh together at circumferentially toothed portions 7, which are formed at a distance R from a center A of rotation in a manner allowing the axis of rotation of the driven member 8 to intersect that of the driven member 6. The driving member 8 is provided with a center boss rotatably supported around the driving shaft 5 through a spherical bushing or bearing 12 rotatable about the point A. An inner ring of the bearing 12 is closely fitted onto the driving shaft 5. Thus, it is understood that the weights of the drum 2 and its contents are loaded to both the roller bearing 13 and the spherical bearing 12 to thereby support the drum 2 for rotation in any direction about the point A to accommodate the bounds and strains of the chassis 1.

The bearings 9 and 10 are supported in the casing 11 which is, in turn, fixedly mounted on a framed stand 14 of the chassis 1 by stud bolts 15. The driving shaft 5 has the bearings 9, 10 and 12 disposed therearound in axially spaced relationship and the load is imposed on the point A about which the bearing 12 is to be rotated, so that the driving shaft 5 will be subjected to a substantial bending moment. Therefore, the bearings 9 and 10 are also subjected to a reaction of such a bending moment in addition to a driving torque necessary for driving the drum 2. With the above arrangement, it is therefore required that the components 5, 9, 10, 11, 14 and 15 be made of special material to provide a sufficient strength to bear the bending moment. This makes the device expensive to manufacture.

Figure 3:
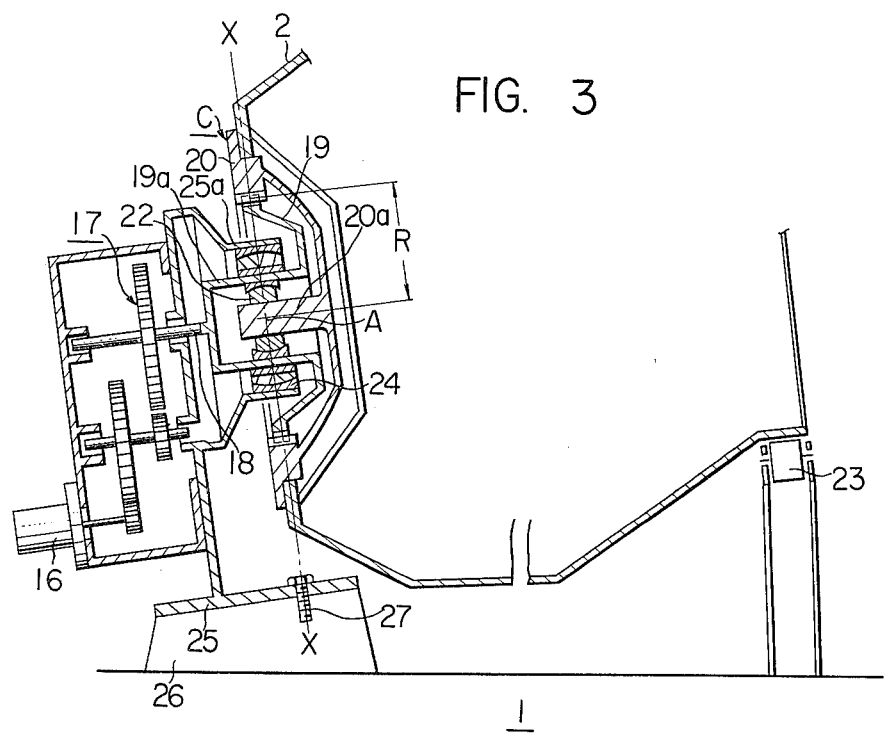
In FIG. 3 is a view, corresponding to FIG. 2, but showing a device constructed in accordance with the present invention.
Figure 4:
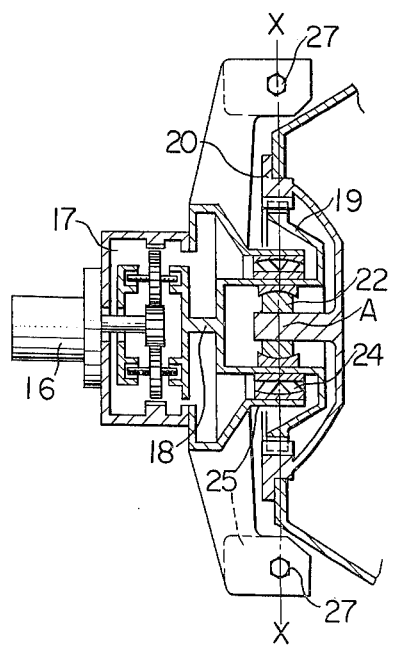
FIG. 4 is an elevational view, partly shown in section, of the device in FIG. 3.

In order to eliminate the disadvantages of the prior art, the invention provides an improved device for driving and supporting the drum, which is shown in FIGS. 3 and 4 and wherein a driving force produced by a fluid operated motor 16 is transmitted through a conventional train of gears 17 to an output driving shaft 18 mounted for rotation in a casing or gear box 25. Between the driving shaft 18 and the drum 2 a universal coupling C is disposed in driving relationship to transmit rotation of the driving shaft 18 to the drum 2. Thus universal coupling C consists of a driving member 19 having a bottomed cylindrical portion 19a fixedly secured to one end of the driving shaft 18, and a driven member 20 fixedly mounted in the drum 2. Both the driving and driven members 19 and 20 are formed with circumferentially spaced teeth 19b and 20b (FIG. 5), respectively, which mesh with each other.

Figure 5:
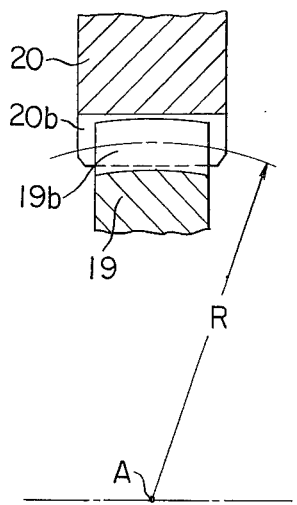
FIG. 5 is a fragmental section showing, on an enlarged scale, driving contacts of a universal coupling for use with the device according to the invention.

The cylindrical portion 19a of the driving member 19 extends outwardly or toward the driving shaft 18. The driven member 20 also has a cylindrical center portion 20a outwardly, concentrically extending into the cylindrical portion 19a of the driving member 19 in a manner allowing a spherical bearing 22 to be disposed therebetween. The spherical bearing 22 consists of an inner ring closely fitted onto the cylindrical portion 20a of the driven member 20, and an outer ring fixedly mounted in the cylindrical portion 19a of the driving member 19. Thus, the inner ring is adapted to rotate in any direction about a center A relative to the outer ring. Further, as best shown in FIG. 5, the tooth 19b of the driving member 19 is curved axially to have a curvature of radius R with a center at A so that the driven member 20 also can rotate in any direction about the center A. The center A lies in a plane represented by a line X — X perpendicular to the axis of the cylindrical portion 20a and coextensive with the spherical bearing 22. The drum 2 is supported for rotation by a roller bearing 23.

Furthermore, the casing 25 is formed with a hollow cylindrical portion 25a extending inwardly or toward the driving member 19 in coaxial relationship therewith. Provided between the oppositely extending cylindrical portions 19a and 25a is an annular space receiving a self-aligning roller bearing 24 to partly support the weights of the drum 2 and its contents, if any. The roller bearing 24 is arranged with a center of rotation at A. The casing 25 is fixedly mounted on a framed stand 26 extending from the chassis 1 by connecting means, such as stud bolts 27, which lie in the aforementioned plane X — X on which all of the spherical bearing 22, self-aligning roller bearing 24 and teeth 19b and 20b of the universal coupling C may normally rotate.

With the abovementioned arrangement of the invention, the drum 2 is supported partly by the roller bearing 23 and partly through the spherical bearing 22, the driving member 19 of the universal coupling and the self-aligning roller bearing 24 by means of the casing 25. Since all the spherical bearing 22, self-aligning roller bearing 24 and driving contacts 19b and 20b between the driving and driven members 19 and 20 are concentrically arranged in the same plane X — X with the common center of rotation at A, and the connecting means 27 for the casing 25 lies in the same plane X — X, both the points and directions of application of the load to the various components are also in this plane X — X. This means that the various components are subjected to a minimum bending moment and can be lessened in weight, resulting in an inexpensive arrangement.

While the invention has been illustrated and described with reference to a single preferred embodiment thereof, it is to be understood that various changes in the details of constructions and the arrangement and combination of parts may be accomplished without departing from the spirit and scope of the invention.

What I claim is:

1. A device for driving and supporting a drum of a concrete mixer truck, comprising in combination: a casing mounted on the mixer truck; means for fixedly connecting said casing to the mixer truck; a driving shaft housed in said casing; a universal coupling disposed to connect said driving shaft in driving relationship with said drum, said coupling being composed of a driving member fixedly mounted on said driving shaft in a manner to rotate about the same axis as said driving shaft, and a driven member fixed to the drum and in driving engagement with said driving member, engaged portions of said driving and driven members being disposed to rotate about said axis; means for rotatably supporting at least the weight of the drum and transmitting it to said casing, said supporting and transmitting means comprising a first spherical bearing disposed between said driving and driven members of said coupling for rotation about said axis of said driving shaft, and a second bearing disposed between said driving member of said coupling and said casing concentrically with said first bearing; all said first bearing, said second bearing and said means for fixedly connecting said casing being arranged on the same plane in which said engaged portions of said coupling rotate so that the drum weight produces a minimum bending moment to said device.

2. The device as claimed in claim 1, wherein said driving member has a central cylindrical hollow portion extending toward and connected to one end of said driving shaft, and said driven member has a central cylindrical portion extending into said hollow cylindrical portion of said driving member with an annular spacing therebetween, within which said first bearing is arranged.

3. The device as claimed in claim 2, wherein said casing has a cylindrical portion extending toward said coupling and spacedly surrounding said hollow cylindrical portion of said driving member to receive said second bearing between said cylindrical portions of said casing and driving member.

4. The device as claimed in claim 2, wherein said first bearing consists of an inner ring closely fitted onto said cylindrical portion of said driven member and an outer ring fixedly mounted on the inner cylindrical surface of said cylindrical portion of said driving member.

5. The device as claimed in claim 3, wherein said second bearing comprises a self-aligning roller bearing.

6. The device as claimed in claim 1, wherein said connecting means comprises stud bolts.

* * * * *